Patented June 22, 1937

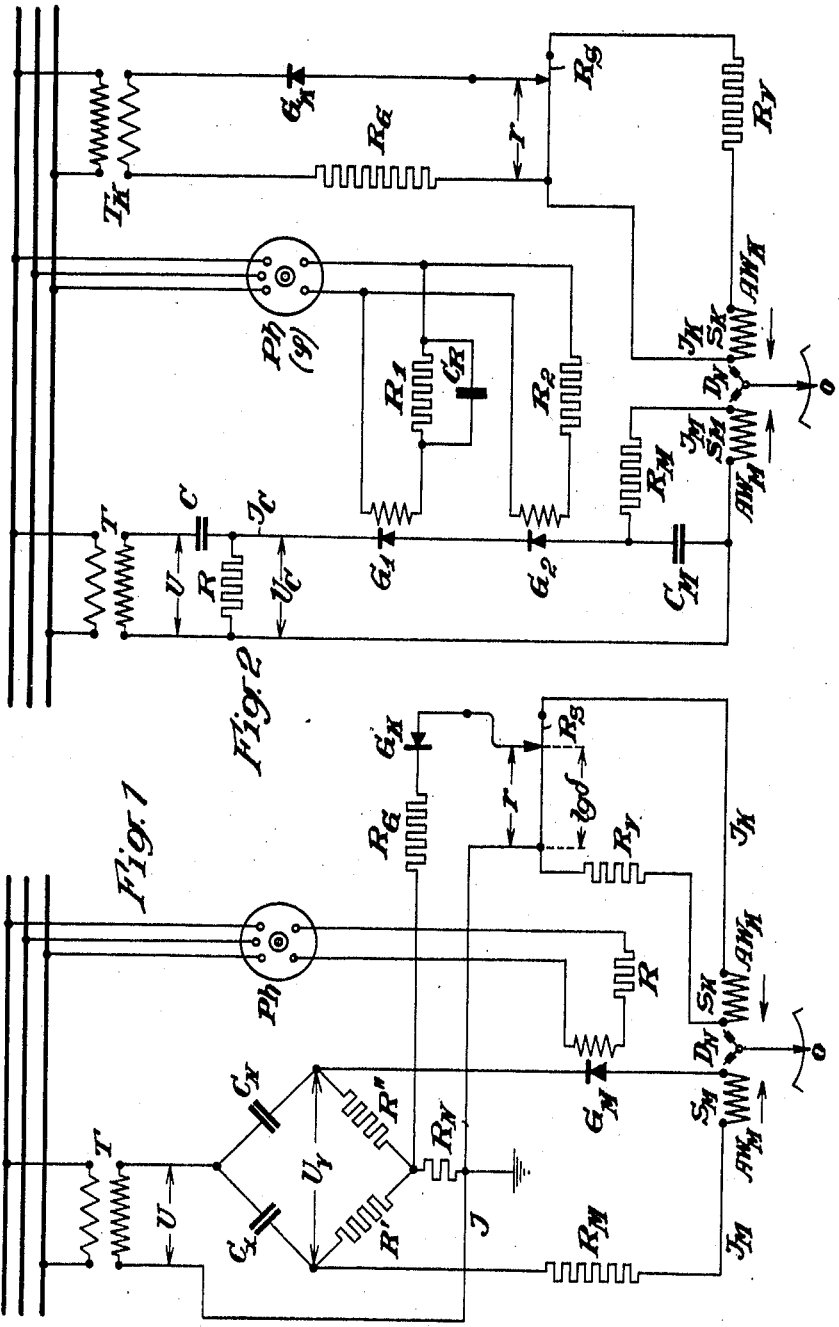

2,084,678

UNITED STATES PATENT OFFICE 2,084,678

ARRANGEMENT FOR CARRYING OUT ALTERNATING CURRENT MEASUREMENTS WITH THE AID OF MEASURING RECTIFIERS

Wilhelm Geyger, Berlin-Schmargendorf, Germany, assignor to Siemens & Halske, Aktiengesellschaft, Siemensstadt, near Berlin, Germany, a corporation of Germany Application July 27, 1935, Serial No. 33,440. In Germany July 30, 1934

4 Claims. (Cl. 175—183)

My invention relates to an arrangement for carrying out alternating current measurements with the aid of measuring rectifiers.

In measuring alternating currents with the aid of measuring rectifiers (for instance copper oxide dry rectifiers or vibratory rectifiers) a sensitive direct-current measuring instrument of the moving coil type, which operates as a deflecting instrument and may be, therefore, readily designed as an indicating or recording instrument, is employed for indicating or recording the currents and voltages to be measured. The moving coil instrument is in this case traversed by a direct current which is proportional to the alternating current to be measured and permits owing to the deflection of the pointer to directly read off the current.

This deflection method is employed to a great extent, since it is very simple. As the energy-consumption of the very sensitive moving coil instrument used in connection with measuring rectifiers is exceedingly small (about $10^{-6}$ to $10^{-7}$ watt), it is easily possible to keep the load on the object to be measured caused by the connection of the measuring arrangement down to such a small value that influences or reactions do not occur which otherwise would interfere with the test readings.

The object of my invention is to provide a simple method for carrying out alternating current measurements with the aid of measuring rectifiers, whereby certain technical advantages in respect of measurements are obtained in particular cases, which are hereinafter described with reference to typical examples. By this method which is based on the application of the balancing principle, it is possible to record in units of length, for instance, resistances or variations of the resistance and electrical or non-electrical quantities to be measured corresponding to the resistances or variations of the resistance (for instance, the values of the phase angle and the loss angle) on a slide wire resistance lying in a compensating circuit and to attain test readings substantially independent of the fluctuations of voltage of the operating energy source.

The measurement of alternating currents by the compensation method according to the invention is characterized by the fact that as an instrument for the indication of the zero value (hereafter designated as zero instrument) a double coil measuring instrument of the moving coil type is employed, one moving coil winding of which is connected through one or more rectifiers to the measuring arrangement in which the alternating current to be measured acts, whereas the other moving coil winding is inserted in a direct-current compensating circuit which is connected through a further rectifier to the alternating-current source feeding the measuring arrangement, i. e., preferably in parallel relation to a resistance fed thereby and lying under certain circumstances in the measuring arrangement. The method has the particular advantage that the alternating current supplied to the direct-current compensating circuit and rectified by a rectifier may have any phase position whatever with respect to the alternating currents and voltages acting in the measuring arrangement.

Characteristic cases as to the application of the invention are hereinafter described in connection with the accompanying drawing, in which Figs. 1 and 2 are diagrams illustrating two embodiments of my invention.

The arrangement shown in Fig. 1 serves particularly to determine the dielectric losses of energy of condenser-like objects to be measured (for instance, power condensers, cables, instrument transformers) in a measuring bridge fed by a high-voltage transformer T. The measurement is based on the basic idea that a voltage $U_V$ practically proportional to the loss angle $tg\delta$ occurs at the terminals of the measuring diagonal, if the high-voltage measuring bridge with respect to its values of capacity and resistance has been compensated according to the equation $C_X.R'=C_N.R''$ to a minimum of the diagonal voltage $U_V$. If the object $C_X$ to be measured is completely free of loss, then $U_V$ is equal to zero and this applies to all frequencies and, therefore, to all wave forms also. If, however, $C_X$ presents dielectric losses of energy of any kind, a more or less deformed or distorted alternating voltage $U_V$ occurs at the terminals of the measuring diagonal, which voltage is measured with the aid of the compensation method according to the invention by means of a measuring rectifier (vibratory rectifier) $G_M$ and of a zero instrument $D_N$ designed as a double coil measuring instrument of the moving coil type. The vibratory rectifier $G_M$ is energized by the operating energy source in a manner well known in the art through a series resistor R and a phase advancer $Ph$. $R_M$ is a series resistor having a high ohmic resistance and is connected in series with the synchronously operating vibrating element of the vibratory rectifier $G_M$.

The effect of the ampere-turns $AW_M$ (diagonal current $J_M$) of the first moving coil winding (measuring winding) $S_M$ which are proportional to the diagonal voltage $U_V$ and, therefore, to the loss angle $tg\delta$ also, is in this case compensated by the opposite effect of the ampere-turns $AW_K$ (comparison current $J_K$) of the second moving coil winding (compensating winding) $S_K$. The compensating winding $S_K$ lies with the slide wire $R_S$ together with the series resistance $R_V$ in a circuit which is connected in parallel relation with the auxiliary resistance $R_N$ through the measuring rectifier (for instance copper oxide dry rectifier) $G_K$ and the series resistance $R_G$. In this connection the ampere-turns $AW_K$ of the compensating winding $S_K$ are proportional to the component resistance $r$ tapped off from the slide wire $R_S$ and it then follows, since the compensating measurement is based on the total current $J$ flowing through the bridge that $$AW_M = \text{const.} J_M = \text{const.} J.tg\delta$$
$$AW_K = \text{const.} J_K = \text{const.} r$$

If $AW_K = AW_M$, i. e., if the zero instrument $D_N$ indicates the zero value $$r = \text{const.} tg\delta$$

The state of compensation ($AW_M = AW_K$) is substantially independent of the position of phase of the comparison current $J_K$; the loss angle $tg\delta$ may, consequently, be directly read off from a scale arranged along the slide wire $R_S$, since it is represented by the component resistance $r$.

The measuring arrangement according to Fig. 1 has furthermore the practical advantage that the insertion of an insulated transformer between the slide wire circuit (compensating circuit) and the bridge (measuring circuit) may be dispensed with and that these circuit parts may be connected directly galvanically, since both differential windings $S_M$ and $S_K$ of the preferably double-wound moving coil of the double coil zero instrument $D_N$ are insulated against one another.

If the double-coil zero instrument $D_N$ be used in connection with an automatically recording measuring instrument of the potentiometer type (relay recording apparatus) which always compensates the component resistance $r$ so as to satisfy the condition $AW_K = AW_M$, the loss angle $tg\delta$ may be continuously recorded (for instance by an ink recorder) in accordance with the operating voltage (U in Fig. 1) or with the time.

The above-described measuring method according to the invention may be employed in a similar manner as in the arrangement shown in Fig. 1 for carrying out all measurements with measuring rectifiers, for which purpose a bridge or compensating circuit fed for any reason whatever by means of alternating current is used for determining resistances or variations of resistances and electrical or non-electrical quantities to be measured (for instance, small differences in phases of resistances, loss angle of condensers and reactors and variations of temperatures) corresponding to these resistances or variations thereof.

Fig. 2 shows as a further embodiment of the invention an advantageous way of measuring alternating currents by the compensation method for gradually recording alternating-current curves with two vibratory rectifiers, whose synchronously moving elements are connected in series. The embodiment shown in Fig. 2 serves to determine the curve form of the distorted alternating current $J_C$ flowing in the condenser C, which alternating current produces at the terminals of the auxiliary resistance R an alternating voltage $U_C$ of a completely uniform curve form. The contacts of the two vibratory rectifiers $G_1$, $G_2$, energized through the common phase advancer $Ph$ and the series resistances $R_1 C_R$ and $R_2$, are connected between the voltage $U_C$ and the condenser $C_M$. Both series resistors are so compensated that the energizing periods of $G_1$ and $G_2$ are displaced by somewhat more or less than a half period (for instance by 182° or 178°).

At the moment at which both contacts are closed, the condenser $C_M$ is being charged, i. e., completely in spite of the short time interval, since the resistance of the condenser leads is small and no self-induction is present. In the following longer time interval until the simultaneous contact-making of $G_1$ and $G_2$ is repeated, the condenser $C_M$ is discharged through the measuring winding $S_M$ of the double-coil zero instrument $D_N$ but only in part, since the series resistance $R_M$ is very great whereas the time interval till the next contact-making occurs is small. When the next simultaneous contact-making of $G_1$ and $G_2$ takes place, only the part lost to the charge need, therefore, be supplemented. The measuring winding $S_M$ receives, therefore, not only individual short impulses, but practically direct current which decreases slowly during the period between two contact-makings. This circuit arrangement has the particular advantage that the measuring current $J_M$ is proportional to the instantaneous value of the alternating current $J_C$ and is in this case independent of the fluctuations of the duration of contact at $G_1$ and $G_2$.

According to the invention the effect of the ampere-turns $AW_M$ (measuring current $J_M$) of the measuring winding $S_M$, which is proportional to the instantaneous value of the alternating current $J_C$ to be tested, is compensated by the effect of the ampere-turns $AW_K$ (comparison current $J_K$) of the compensating winding $S_K$ acting in opposition thereto. This winding lies with the slide wire $R_S$ together with the series resistance $R_V$ in a current-dividing connection which is connected to the transformer $T_K$ through the measuring rectifier (for instance a copper oxide dry rectifier) $G_K$ and the series resistance $R_G$, the transformer $T_K$ being fed by the alternating-current source which produces the operating voltage U by means of the transformer T. With this connection the ampere-turns $AW_K$ are proportional to the component resistance $r$ tapped from the slide wire $R_S$. It then follows that $$AW_K = \text{const.} U.r.$$

The ampere-turns $AW_M$ are, on the one hand, proportional to the operating voltage U (i. e., to the R. M. S. value of U) and, on the other hand, depend upon the adjustment of the phase angle $\varphi$ of the phase advancer $Ph$. It then follows that $$AW_M = \text{const.} U.f(\varphi).$$

If $AW_K = AW_M$, i. e., if the double-coil zero instrument $D_N$ indicates the zero value, $$r = \text{const.} f(\varphi).$$

The state of compensation ($AW_M = AW_K$) in this case also is substantially independent of the phase position of the comparison current $J_K$.

However, it is of particular importance that the component resistance $r$ be only dependent upon the adjustment of the phase angle $\varphi$ of the phase advancer $Ph$ and independent of the fluctuations of the R. M. S. value of the alternating current $J_c$ to be tested or of the operating voltage $U$. In this manner, a particularly accurate measurement is attained, since the recording of the curve cannot be impaired at all by the fluctuations of voltage.

If by rotating the phase advancer $Ph$ the phase position is changed between the energizing currents of $G_1$ and $G_2$ displaced relatively to each other by a constant phase angle and the alternating current $J_c$ to be tested, then it is possible to represent graphically in succession all instantaneous values of this current as the length $r$ of the slide wire independently of the voltage. If the phase angles $\varphi$ read off from the phase advancer are plotted horizontally against the vertically plotted corresponding lengths $r$ of the slide wire, then the time characteristic of the alternating current $J_c$ during a period is attained, i. e., the alternating-current curve. If two or more alternating-current curves are to be simultaneously recorded in their proper phase position with respect to one another, then the corresponding instantaneous values for the individual curves for each adjustment of the phase angle $\varphi$ of the phase advancer are to be determined as lengths $r$ of the slide wire and plotted in a coordinate system.

I claim as my invention:

1. In a system for measuring complex alternating current factors, a source of alternating current, a measuring instrument suitable for comparing two currents and provided with two windings, a measuring circuit fed from said source of alternating current, said circuit including one of the windings of said instrument and also including at least one rectifier, means extraneous to the measuring circuit but connected with said source of alternating current, for actuating said rectifier with respect to its stop-and-flow phase in the desired phase relation to the alternating current source, means connected with said actuating means for adjusting the phase relation of said rectifier to the source of alternating current, an ohmic resistance connected in series with the other winding of the measuring instrument and provided with a tap adjustable to measure the factor to be determined, and circuit connections to said adjustable tap and to a different point of said resistance, from said source of alternating current, said circuit connections including another rectifier.

2. In a system for measuring complex alternating current factors, a source of alternating current, a measuring instrument suitable for comparing two currents and provided with two windings, a measuring circuit fed from said source of alternating current, said circuit including one of the windings of said instrument and also including a plurality of rectifiers, means extraneous to the measuring circuit but connected with said source of alternating current, for actuating said rectifier with respect to its stop-and-flow phase in the desired phase relation to the alternating current source, means connected with said actuating means for adjusting the phase relation of said rectifiers to the source of alternating current and to each other, an ohmic resistance connected in series with the other winding of the measuring instrument and provided with a tap adjustable to measure the factor to be determined, and circuit connections to said adjustable tap and to a different point of said resistance, from said source of alternating current, said circuit connections including another rectifier.

3. In a system for measuring complex alternating current factors, a source of alternating current, a measuring instrument suitable for comparing two currents and provided with two windings, a bridge circuit composed of capacity elements and resistance elements and fed from said source of alternating current, connections from one of the diagonal branches of said bridge circuit to one of the windings of said instrument, a rectifier included in said connections, means extraneous to the said bridge circuit, for actuating said rectifier with respect to its stop-and-flow phase in the desired phase relation to the alternating current source, means connected with said actuating means for adjusting the phase relation of said rectifier to the source of alternating current, an ohmic resistance connected in series with the other winding of the measuring instrument and provided with a tap adjustable to measure the factor to be determined, and circuit connections to said adjustable tap and to a different point of said resistance, from said source of alternating current, said circuit connections including another rectifier.

4. In a system for measuring complex alternating current factors, a source of alternating current, a measuring instrument suitable for comparing two currents and provided with two windings, a bridge circuit composed of capacity elements and resistance elements and fed from said source of alternating current, connections from one of the diagonal branches of said bridge circuit to one of the windings of said instrument, a rectifier included in said connections, means extraneous to the said bridge circuit, for actuating said rectifier with respect to its stop-and-flow phase in the desired phase relation to the alternating current source, means connected with said actuating means for adjusting the phase relation of said rectifier to the source of alternating current, an ohmic resistance connected in series with the other winding of the measuring instrument and provided with a tap adjustable to measure the factor to be determined, and circuit connections to said tap and to a different point of said resistance, said connections including another rectifier and being connected in a shunt to a circuit portion which is in series with said bridge circuit.

WILHELM GEYGER.